US011353662B2

(12) United States Patent
Leigh et al.

(10) Patent No.: US 11,353,662 B2
(45) Date of Patent: Jun. 7, 2022

(54) SMART CARRIERS AND SMART ADAPTERS FOR AUTOMATIC DISCOVERY OF FIBER ASSEMBLIES

(71) Applicant: Hewlett Packard Enterprise Development LP, Houston, TX (US)

(72) Inventors: Kevin B. Leigh, Houston, TX (US); John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 85 days.

(21) Appl. No.: 16/396,509

(22) Filed: Apr. 26, 2019

(65) Prior Publication Data
US 2020/0341201 A1 Oct. 29, 2020

(51) Int. Cl.
*G02B 6/38* (2006.01)
*G02B 6/44* (2006.01)
*G06K 7/10* (2006.01)
*G02B 6/40* (2006.01)
*G02B 6/42* (2006.01)

(52) U.S. Cl.
CPC .......... *G02B 6/385* (2013.01); *G02B 6/3825* (2013.01); *G02B 6/3831* (2013.01); *G02B 6/3851* (2013.01); *G02B 6/3895* (2013.01); *G02B 6/447* (2013.01); *G06K 7/10237* (2013.01)

(58) Field of Classification Search
CPC .. G02B 6/3895; G02B 6/3825; G02B 6/3897; G02B 6/4452; G02B 6/3879; G02B 6/447; G02B 6/3817; G02B 6/3831; G02B 6/3878; G02B 6/4246; G02B 6/4284; G02B 6/4292
See application file for complete search history.

(56) References Cited

U.S. PATENT DOCUMENTS 6,829,427 B1 * 12/2004 Becker ................. A61B 18/22
385/147
8,410,909 B2 * 4/2013 de Jong ............... G02B 6/3895
340/10.4

(Continued)

OTHER PUBLICATIONS

Global-Tag.com; "Fibery—RFID and NFC Tag for Electrical Cables"; printed on Apr. 10, 2019 from webpage: https://www.global-tag.com/store/fiberv-rfid-nfc-tag-electric-cables/: 3 pages.

*Primary Examiner* — Ryan A Lepisto
*Assistant Examiner* — Erin D Chiem
(74) *Attorney, Agent, or Firm* — Sheppard Mullin Richter & Hampton LLP

(57) ABSTRACT

An electronically-managed optical fiber connection system is provided. A smart ferrule carrier comprises a plurality of ferrule bays configured to accept a tagged optical ferrule assembly. Each tagged optical ferrule assembly comprises an identification (ID) tag storing identification information for the optical ferrule assembly. A smart carrier board comprising a carrier controller is configured to read and/or write information to/from the ID tag of each tagged optical ferrule assembly. A smart carrier adapter is configured to accept a plurality of smart ferrule carriers, the smart carrier adapter including an adapter controller system. The adapter controller system includes an adapter controller configured to communicate with the carrier controller of each installed smart ferrule carrier and a system controller.

7 Claims, 13 Drawing Sheets

(56) References Cited

U.S. PATENT DOCUMENTS

| | | | | |
|---|---|---|---|---|
| 9,111,249 B2* | 8/2015 | Mather | ............... | G06Q 10/087 |
| 9,380,358 B2* | 6/2016 | Caveney | ............... | G02B 6/3895 |
| 9,563,832 B2 | 2/2017 | Downie et al. | | |
| 9,722,367 B2 | 8/2017 | Standish et al. | | |
| 2005/0215119 A1* | 9/2005 | Kaneko | ............... | H01R 9/2475 |
| | | | | 439/607.01 |
| 2010/0079248 A1 | 4/2010 | Greveling | | |
| 2012/0000977 A1* | 1/2012 | German | ............... | H04Q 1/136 |
| | | | | 235/375 |
| 2013/0328666 A1* | 12/2013 | Renfro, Jr. | ........... | G02B 6/4284 |
| | | | | 340/10.1 |
| 2014/0016901 A1* | 1/2014 | Lambourn | ........... | G02B 6/3897 |
| | | | | 385/75 |
| 2014/0141649 A1* | 5/2014 | Standish | ............... | H01R 13/44 |
| | | | | 439/620.01 |

\* cited by examiner

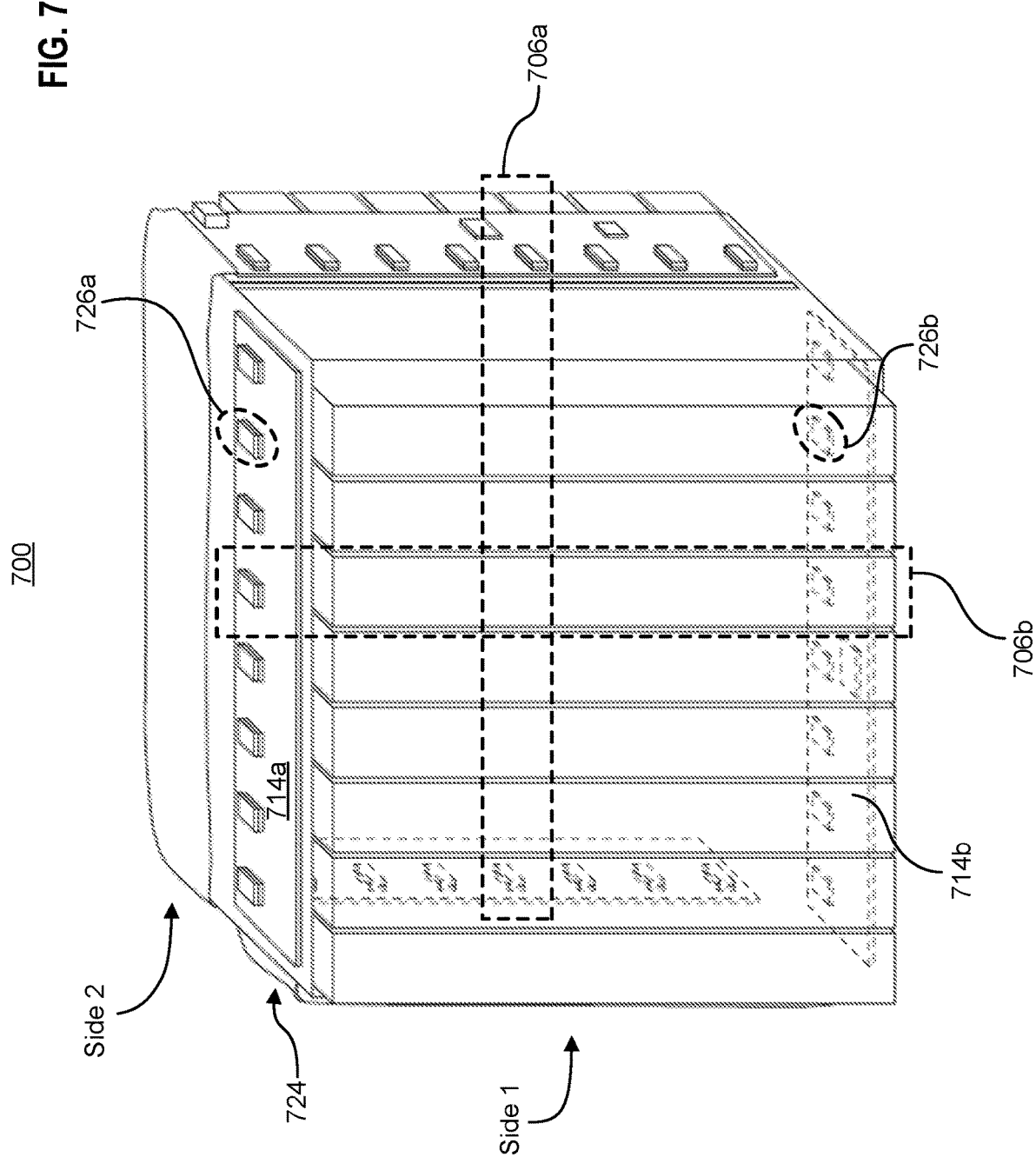

SMART CARRIERS AND SMART ADAPTERS FOR AUTOMATIC DISCOVERY OF FIBER ASSEMBLIES

BACKGROUND

Fiber optic cables facilitate transmission of data over optical cables rather than electrical cables. Compared to electrical cables, fiber optic cables are less susceptible to electromagnetic interference, enabling transmission of data over further distances. Fiber optic cables generally terminate in a connector assembly, where the optical fibers within the cable are split, with each coupled to a ferrule. The ferrule serves to protect and assist in aligning the ends of the optical fibers so the optical signals traveling within those optical fibers egress properly. As networks scale, the number of individual optical connections required increases tremendously, especially with respect to mesh networking (or all-to-all connectivity) implementations.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

FIG. 7 illustrates a split-board smart carrier adapter in accordance with embodiments of the technology disclosed herein.

Figure 1:
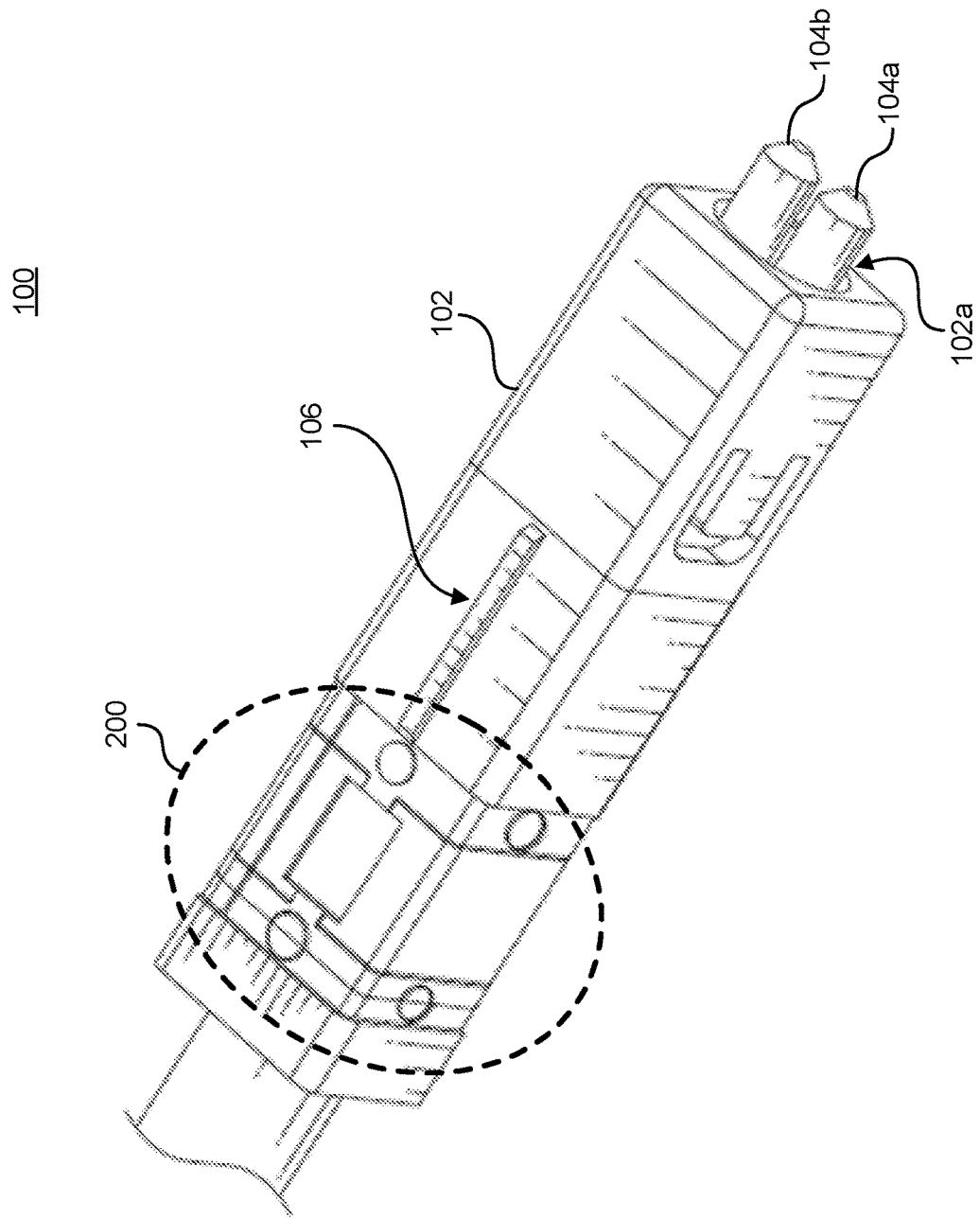
FIG. 1 shows a perspective view of an example tagged optical ferrule assembly in accordance with embodiments of the technology disclosed herein.

The figures are not exhaustive and do not limit the present disclosure to the precise form disclosed.

DETAILED DESCRIPTION

The ability to efficiently identify or tag optical fibers and connections within a system decreases dramatically as density increases. The tight bundling of the optical fibers renders the use of written labels impractical. There is insufficient room for labels that hang off of the optical fibers to fit and be easily accessible by technicians, and the thinness of optical fibers renders affixing identification labels along the surface of the wire essentially illegible. Although wireless technologies, such as near-field communication (NFC) or radio frequency identification (RFID), may be useful in other environments, external readers designed to detect such communication signals require separation of the various tags. The tight coupling of optical fibers limits the space between optical fibers, reducing the effectiveness of such strategies. As optical transceivers are integrated within systems due to increasing challenges in signal routing and related EMI/RFI noise containment, high power consumptions and related cooling, and high costs of signal regeneration devices, optical fiber density within and across interconnected system chasses will become new challenges. It will be important for technicians to know how optical fiber assemblies with high fiber count are interconnected together in order for them to trouble-shoot connectivity issues during installations and/or servicing. In addition, system topology management software are increasingly valued by datacenter operators to have detail views on how equipment are interconnected in order for them to adequately manage equipment for bandwidth utilizations, power/thermal allocations, workload distributions, trouble-shooting connectivity issues, etc., especially when fiber connectivity points are encased within confinement.

Embodiments of the present disclosure provide an efficient method of tagging and identifying optical fibers within high density cabling implementations within confinement such as system boards, system chassis, fiber trays in enclosures, patch panels in racks, rack plenums, cable raceways across racks, etc. As discussed in detail below, embodiments of the technology disclosed herein provide an electronically-managed optical fiber connection system, comprising tagged optical ferrule assemblies, smart ferrule carriers, and smart adapters. The system may be used to implement low-cost, both inter- and intra-system, high density all-to-all or many-to-many connectivity within different network topologies. Embodiments in accordance with the present disclosure enable automatic discovery of tagged optical ferrule assemblies, including which processor chips or interconnects the tagged optical ferrule assemblies are connected to, for more easily managing, installing, and/or debugging connection topologies. Each tagged optical ferrule assembly has an identification tag affixed to or built into the assembly housing, and is configured to fit within a smart ferrule carrier. The smart ferrule carrier includes a smart carrier board having a carrier controller and other components configured to read the identification tag affixed to each tagged optical ferrule assembly, whether positioned in a "serial" or a "parallel" orientation. A smart carrier adapter is configured to accept multiple smart ferrule carriers, allowing for in-line or orthogonal mating of the smart ferrule carriers. The smart carrier adapter includes an adapter controller and other components configured to communicate with the carrier controller to readout the identification information of the tagged optical ferrule assemblies for each of the installed smart ferrule carriers. Use of the tagged optical ferrule assemblies, smart ferrule carriers, and smart carrier adapter in accordance with embodiments of the technology disclosed herein provides an easy to understand and follow tagging system for densely-populated optical interconnections, reducing costs associated with installation, management, and debugging of optical networks.

FIG. 1 shows an example perspective view of an example tagged optical ferrule assembly 100 in accordance with embodiments of the technology disclosed herein. In various embodiments, tagged optical ferrule assembly 100 may include components similar to the components of compact duplex connector assembly disclosed in U.S. patent application Ser. No. 16/361,975, or the components of duplex ferrule connectors disclosed in U.S. patent application Ser. No. 16/362,464, both filed on Mar. 22, 2019, the disclosures of which are hereby incorporated herein in their entirety. As illustrated in FIG. 1, tagged optical ferrule assembly 100 includes an assembly housing 102 having an interior cavity in which an optical cable may be inserted. Two ferrules 104a, 104b extend out of an opening 102a of the assembly housing 102, each ferrule 104a, 104b configured to protect cladded optical fiber cores of the optical cable and assist in aligning the cladded fiber cores with corresponding cladded fiber cores of a mating optical cable (not shown in FIG. 1). Although opening 102a is shown as having a circular shape, a person of ordinary skill in the art would understand that in other embodiments the shape of opening 102a may be any shape dimensioned such that ferrules 104a, 104b have clearance to extend out from the assembly housing 102 without interfering with the other ferrule and/or an edge of opening 102a. In various embodiments, opening 102a may be shaped to allow assembly housing 102 to be installed in a connector adapter.

Assembly housing 102 may further include a carrier alignment feature 106 to enable each tagged optical ferrule assembly 100 to be arranged in a serial orientation or a parallel orientation within a smart ferrule carrier (discussed in detail below with respect to FIG. 6A). Carrier alignment feature 106 may be configured to ensure that polarity is maintained during installation or reconfiguration of the optical networking topology. In various embodiments, carrier alignment feature 106 may be disposed only on one side of assembly housing 102. Carrier alignment feature 106 may be configured to ensure tagged optical ferrule assemblies 100 can be installed in only on position for a serial orientation or a parallel orientation, thereby ensuring the consistency of the polarity orientation of each tagged optical ferrule assembly 100.

Figure 2:
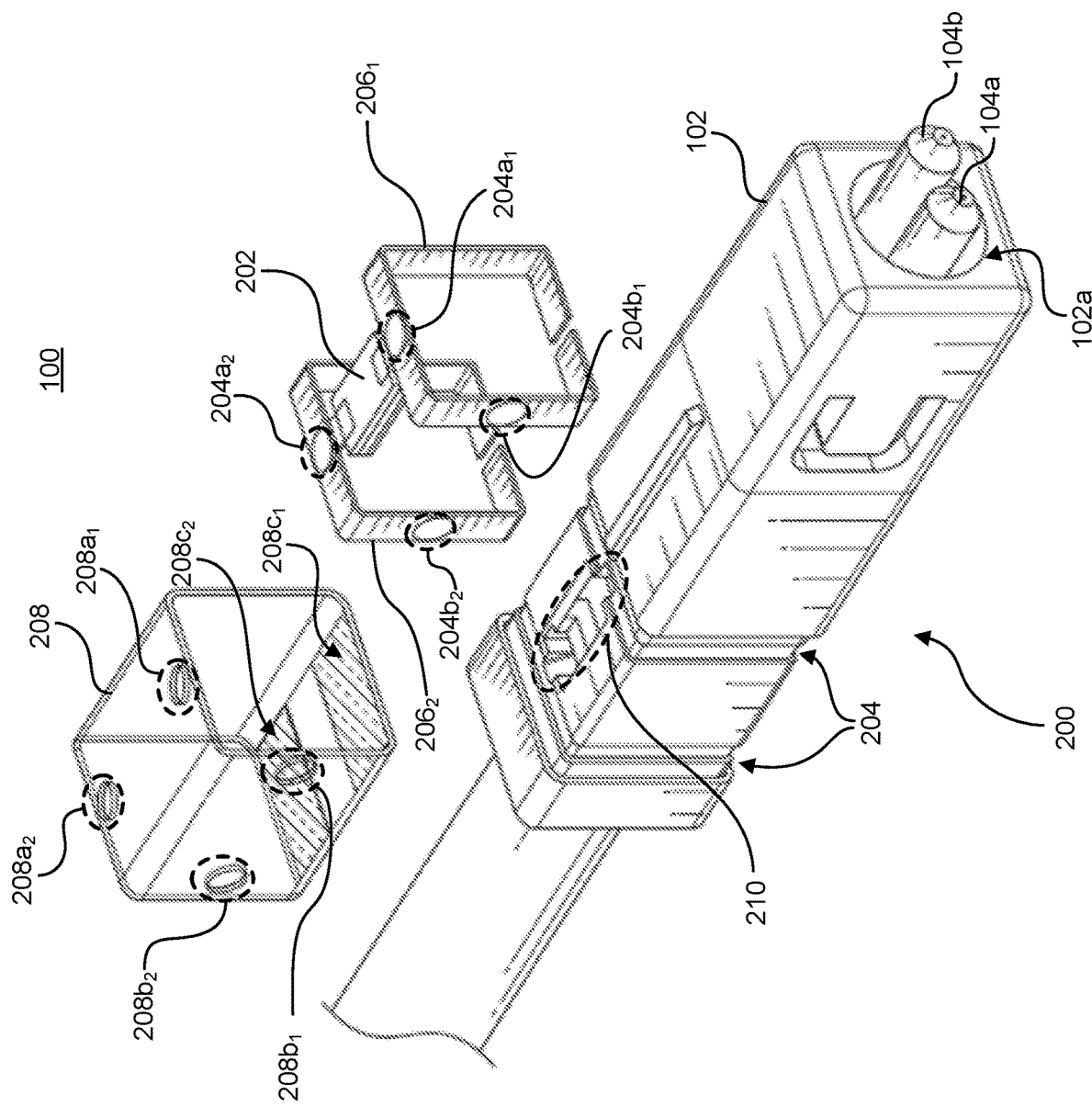
FIG. 2 illustrates an exploded view of an example ID tag portion of an example tagged optical ferrule assembly in accordance with embodiments of the technology disclosed herein.

Tagged optical ferrule assembly 100 may include an ID tag portion 200. In various embodiments, ID tag portion 200 may include one or more types of identification tags containing identification information for the respective tagged optical ferrule assembly 100. FIG. 2 illustrates an exploded view of an example ID tag portion 200 of tagged optical ferrule assembly 100 in accordance with embodiments of the present disclosure. Example ID tag portion 200 is provided for illustrative purposes only and should not be interpreted as limiting the scope of the subject matter disclosed herein to only the illustrated embodiment.

As illustrated in FIG. 2, ID tag portion 200 comprises an ID tag 202, terminals $204a_1$, $204a_2$, $204b_1$, $204b_2$, contact strips $206_1$, $206_2$, and protective cover 208. In various embodiments, ID tag 202 may comprise one of a variety of identification tags known in the art, including but not limited to a near-field communication (NFC) tag, a radio frequency identification (RFID) tag, or other types of automatic identification and capture tags known in the art. In various embodiments, ID tag 202 may store various identifying characteristics about the tagged optical ferrule assembly 100, including but not limited to the type of cladded fiber cores (e.g., single-mode fiber, multi-mode fiber, multi-core single-mode fiber, etc.) embodied within tagged optical ferrule assembly 100, the source device of tagged optical ferrule assembly 100, manufacturer, manufacturing date/lot number, installed date, etc., or other characteristics of tagged optical ferrule assembly 100 of use in managing the network connections. A person of ordinary skill in the art would understand that ID tag 202 in accordance with embodiments of the present disclosure may maintain a variety of different characteristics which may be of use in managing the network. When freely handled (i.e., not contained within a smart ferrule carrier), a technician may utilize a compatible reader to obtain the identifying information from tagged optical ferrule assembly 100. In various embodiments, identifying information may include, but is not limited to, a name assigned to the tagged optical ferrule assembly, the processing chip and/or interconnect to which the tagged optical ferrule assembly is connected, the type of tagged optical ferrule assembly (i.e., arranged in a parallel orientation or a serial orientation), as well as other identifying and/or configuration information.

In various embodiments, ID tag portion 200 may include a cavity 210 configured to secure ID tag 202. As illustrated in FIG. 2, cavity 210 may be configured such that ID tag 202 sits below a surface of assembly housing 102 such that, when protective cover 208 is added, protective cover 208 sits flush with the surface of assembly housing 102. In other embodiments, cavity 210 may be configured such that ID tag 202 sits flush with the surface of assembly housing 102. In still other embodiments, cavity 210 may be configured to secure ID tag 202 such that ID tag 202 is positioned above the surface of assembly housing 102. In such embodiments, the smart ferrule carrier may include one or more elements configured to account for ID tag 202.

Figure 3A:
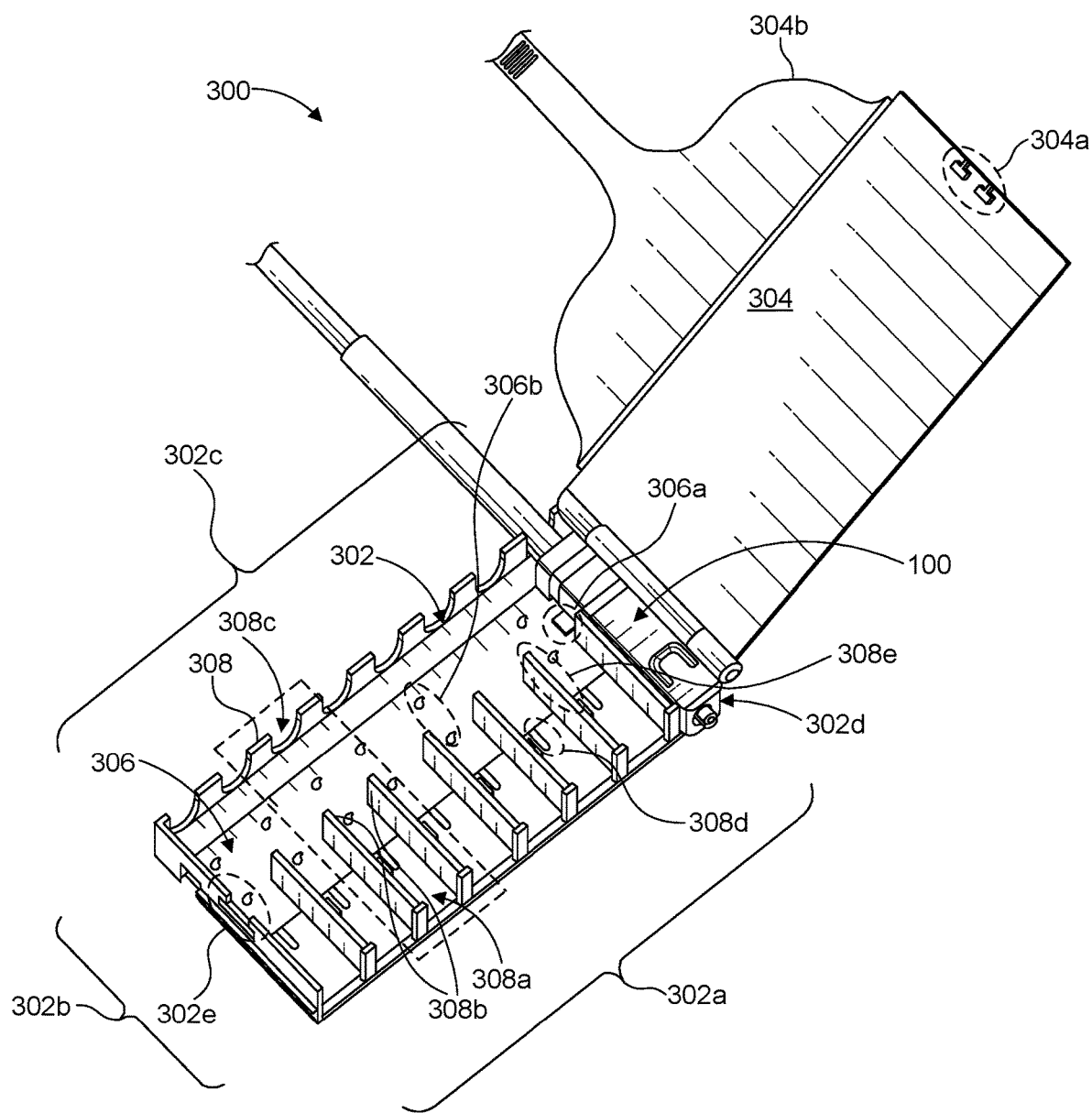
FIG. 3A illustrates an example smart ferrule carrier in an open position in accordance with embodiments of the technology disclosed herein.
Figure 3B:
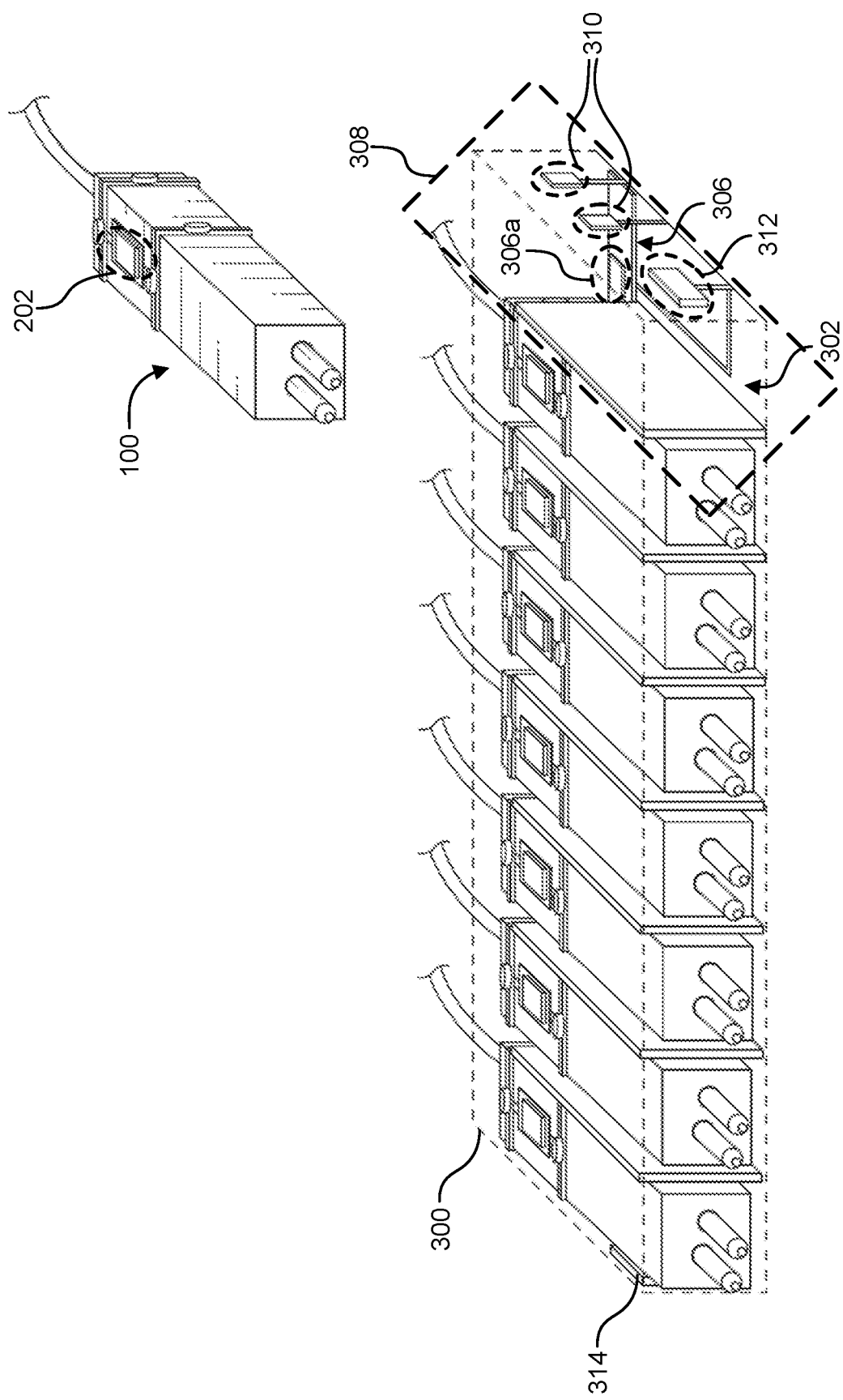
FIG. 3B illustrates another view of the smart ferrule carrier of FIG. 3A.

In various embodiments, ID tag portion 200 may include one or more terminals $204a_1$, $204a_2$, $204b_1$, $204b_2$. Terminals $204a_1$, $204a_2$, $204b_1$, $204b_2$ may be configured to communicatively couple with corresponding tag reader/writer within the smart ferrule carrier (not shown in FIG. 2). In various embodiments, a first pair of terminals $204a_1$, $204a_2$ may be disposed such that the first pair of terminals $204a_1$, $204a_2$ are positioned with the corresponding tag reader/writer of the smart ferrule carrier when tagged optical ferrule assembly 100 is positioned in a serial orientation, while a second pair of terminals $204b_1$, $204b_2$ are disposed such that the second pair are positioned properly when tagged optical ferrule assembly 100 is positioned in a parallel orientation within the smart ferrule carrier. An example for serial orientation of tagged optical ferrule assemblies 100 is illustrated in FIG. 3B, where all the ferrule pairs 104a, 104b of all the tagged optical ferrule assemblies 100 installed in a smart carrier 300 are in-line or in serial. An example for parallel orientation of tagged optical ferrule assemblies 100 is illustrated in FIG. 3A (only one ferrule assembly 100 shown for clarity), where all the ferrule pairs 104a, 104b of all the tagged optical ferrule assemblies 100 installed in a smart carrier 300 would be in parallel.

Figure 4:
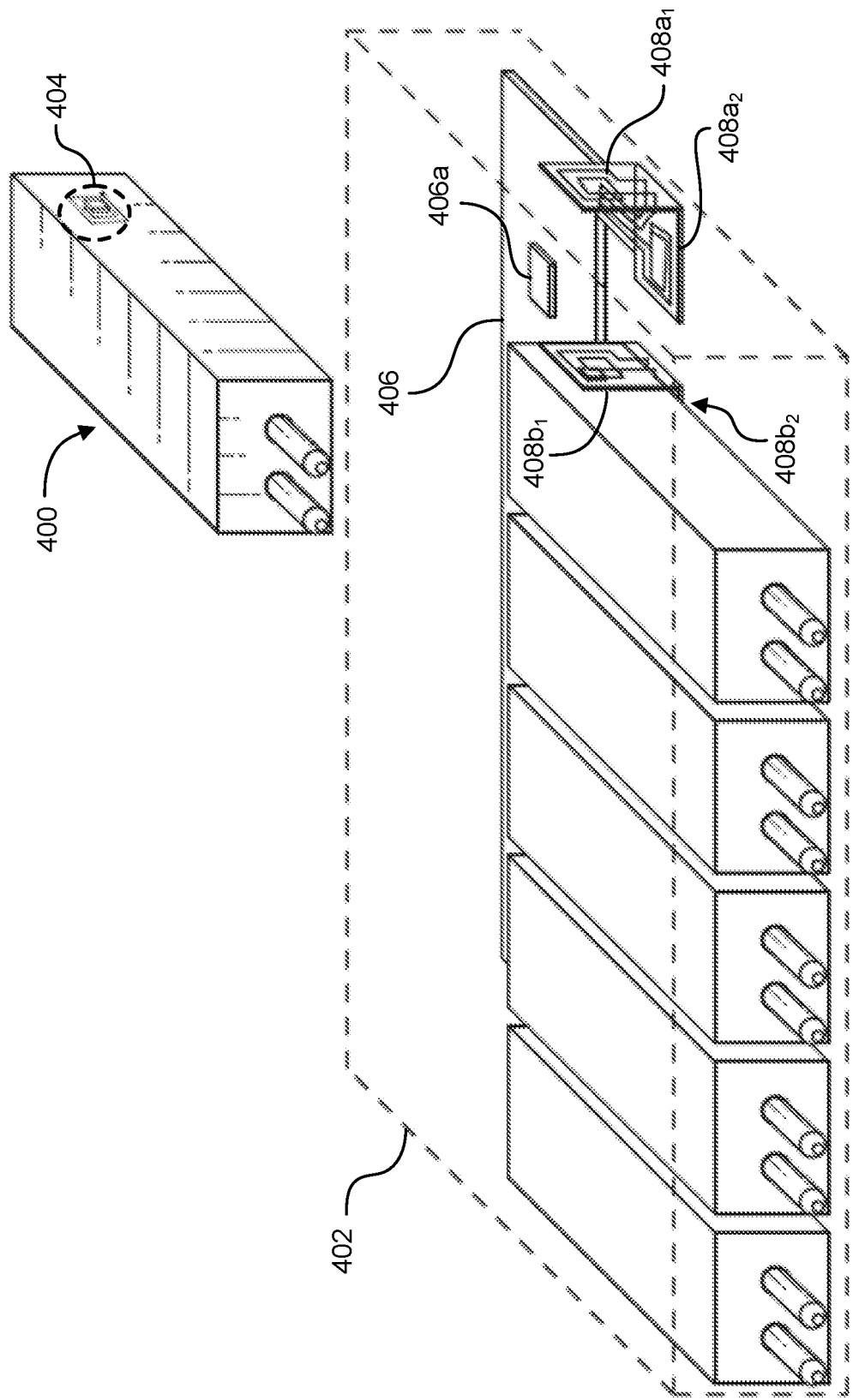
FIG. 4 illustrates another example smart ferrule carrier in accordance with embodiments of the technology disclosed herein.
Figure 5B:
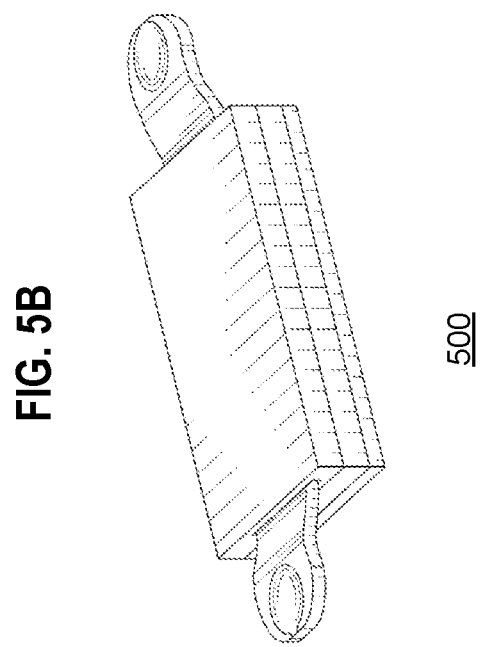
FIG. 5B shows a non-exploded view of the example ID tag of FIG. 5A.
Figure 5A:
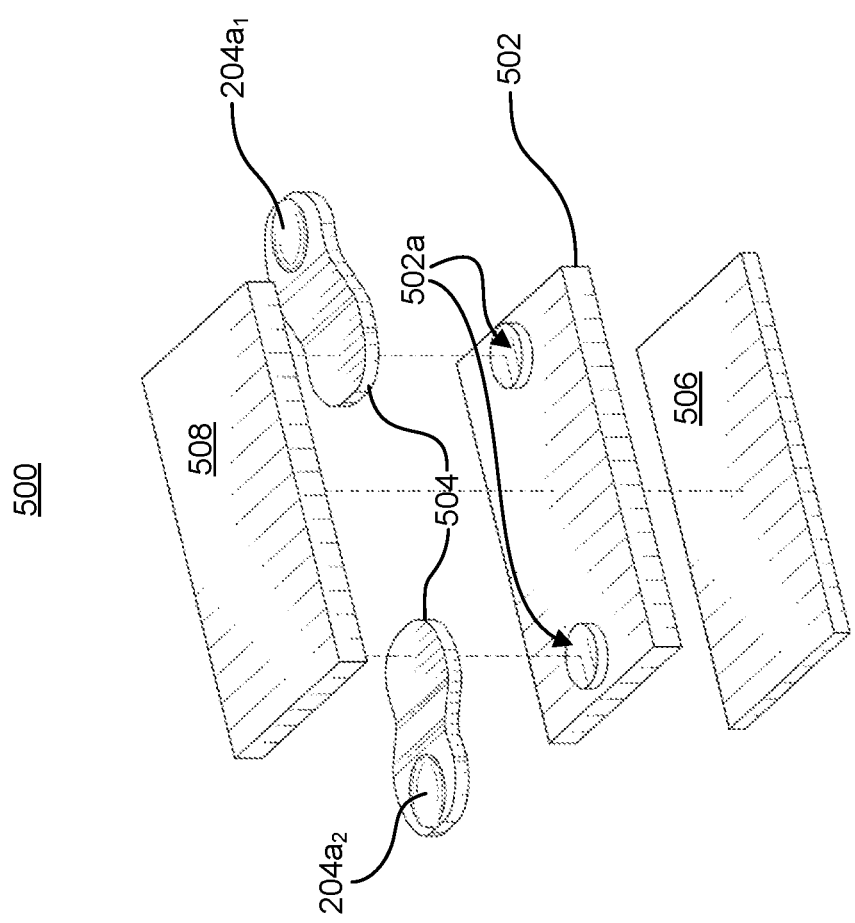
FIG. 5A shows an exploded view of an example ID tag in accordance with embodiments of the technology disclosed herein.

In various embodiments, ID tag 202 (illustrated in FIGS. 1-4) may comprise example ID tag 500 in accordance with embodiments of the present disclosure and illustrated in FIGS. 5A and 5B. As illustrated in FIG. 5A, ID tag 500 may comprise a transceiver portion 502. In various embodiments, transceiver portion 502 may comprise transceiver circuitry facilitating read and write operations to be performed, a memory component configured to store identification information, and a processor communicatively coupled to the transceiver circuitry and the memory component. Transceiver portion 502 may comprise an integrated circuit in some embodiments. In various embodiments, transceiver portion 502 may comprise any ID chip known in the art. Transceiver portion 502 may be disposed between two protective layers 506 and 508 in some embodiments, as illustrated in FIG. 5B. The protective layer 506 may have adhesive material coated on both sides. The protective layer 508 may have adhesive material coated on the bottom side facing the tag ID transceiver portion 502. As illustrated in FIG. 5A, transceiver portion 502 may comprise two chip terminals 502a in various embodiments, configured to correspondingly connect with the interior ends 504 of terminal pair $204a_1$, $204a_2$. In this way, transceiver portion 502 may electrically interface with terminal pair $204a_1$, $204a_2$, enabling the information stored in the memory of transceiver portion 502 to be read and/or written to transceiver portion 502 through terminal pair $204a_1$, $204a_2$. In various embodiments, an antenna or other transmission components may be connected to chip terminals 502a to enable contactless read and write operations. In such embodiments, the antenna may be disposed within protective layer 506 and/or protective layer 508.

Referring to FIG. 2, in the illustrated embodiment, the first and second pairs include a first terminals $204a_1$, $204b_1$ disposed on a first end of ID tag 202 and a second terminals $204a_2$, $204b_2$ disposed on a second end of ID tag 202. Each pair may be configured such that the respective terminals (terminal pair $204a_1$, $204a_2$ of the first pair or terminal pair $204b_1$, $204b_2$ of the second pair) are associated with a parallel orientation of tagged optical ferrule assembly 100 or a serial orientation of tagged optical ferrule assembly 100.

In various embodiments, contact strips $206_1$, $206_2$ may be used to electrically connect the serial-orientation terminals $204a_1$, $204b_1$ and to electrically connect the serial-orientation terminals $204a_2$, $204b_2$, enabling either terminal pair $204a_1$, $204a_2$ or terminal pair $204b_1$, $204b_2$ to carry the identification information from ID tag 202. In various embodiments, ID tag portion 200 may include contact channels 204 within which contact strips $206_1$, $206_2$ and terminals $204a_1$, $204a_2$, $204b_1$, $204b_2$ may be secured. In some embodiments, contact channels 204 may be disposed at the first end and the second end of ID tag portion 200. In some embodiments, contact strips $206_1$, $206_2$ may be a separate conductor disposed within contact channels 204, while in other embodiments contact strips $206_1$, $206_2$ may be part of ID tag portion 200 of assembly housing 102 (e.g., a conductive coating, molding into assembly housing 102, etc.) where ID tag 202 may be contacting contact strips $206_1$, $206_2$ on the undersides of terminals $204a_1$ and $204a_2$. Contact strips $206_1$, $206_2$ and terminals $204a_1$, $204a_2$, $204b_1$, $204b_2$ may be made of any suitable electrical conductor known in the art and commonly used for such purposes.

In various embodiments, ID tag portion 200 may include a protective cover 208. Protective cover 208 may provide protection for ID tag 202 and, in some embodiments, may also be used as a physical label. As illustrated, protective cover 208 may include contact openings $208a_1$, $208a_2$, $208b_1$, $208b_2$ configured to allow terminals $204a_1$, $204a_2$, $204b_1$, $204b_2$ to properly communicatively couple with the corresponding tag reader/writer of the smart ferrule carrier. Contact opening $208a_1$, $208a_2$, $208b_1$, $208b_2$ may be disposed on a first end of protective cover 208 corresponding to the first end of ID tag portion 200, a second end of protective cover 208 corresponding to the second end of ID tag portion 200, or a combination of both. In some embodiments, contacts strips $206_1$, $206_2$ may include an opening (as illustrated in FIG. 2) to assist in installing contact strips $206_1$, $206_2$. In such embodiments, protective cover 208 may include conductive regions $208c_1$, $208c_2$ disposed on an interior surface of protective cover 208 to electrically-close contact strips $206_1$, $206_2$, respectively. Conductive region $208c_1$ corresponds to terminals $204a_1$, $204b_1$, and conductive region $208c_2$ corresponds to terminals $204a_2$, $204b_2$. In other embodiments, conductive region 208b may be omitted.

Although discussed with respect to ID tag portion 200, this embodiment is provided for illustrative purposes only. A person of ordinary skill would understand that other embodiments of ID tag portion are within the scope of the technology of the present disclosure. FIG. 4 (discussed in greater detail below) illustrates another non-limiting example of the ID tag portion of an example tagged optical ferrule assembly.

FIGS. 3A-3E show various aspects of an example smart ferrule carrier 300 in accordance with embodiments of the present disclosure. In various embodiments, smart ferrule carrier 300 may include one or all components of the ferrule carrier discussed within U.S. patent application Ser. No. 16/362,464 identified above. Smart ferrule carrier 300 comprises a base 302 and a lid 304. Base 302 comprises four sides 302a, 302b, 302c, 302d defining an interior of smart ferrule carrier 300. In various embodiments, sides 302a, 302b, 302c, 302d may extend upward from base 302 to a height equal to a height of tagged optical ferrule assembly 100. In various embodiments, base 302 may comprise a plurality of ferrule bays 308. Ferrule bays 308 are configured to hold one tagged optical ferrule assembly 100. In various embodiments, each ferrule bay 308 may include a bay opening 308a in front side 302a of the base 302. A plurality of separators 308b may extend upwards from base 302 to separate each ferrule bay 308. In various embodiments, two separators 308b may define an interior of each ferrule bay 308, while side wall 302b may work with a separator to define the interior of the ferrule bay abutting side wall 302b and side wall 302d may work with a separator to define the interior of the ferrule bay abutting side wall 302d.

In various embodiments, one or more separators 308b may extend upward from base 302 to a height equal to the height of sides 302a, 302b, 302c, 302d or a height equal to the height of tagged optical ferrule assembly 100. In other embodiments, one or more separators 308b may extend to height less than the height of sides 302, 302b, 302c, 302d or a height less than to the height of tagged optical ferrule assembly 100. As a non-limiting example, one or more separators 308b may extend to a height above base 302 that is equal to half the height of sides 302a, 302b, 302c, 302d or half the height of tagged optical ferrule assembly 100. As another non-limiting example, one or more separators 308b may extend to a height above base 302 between 25%-75% of the height of sides 302a, 302b, 302c, 302d or the height of tagged optical ferrule assembly 100. As illustrated in FIG. 3A, one or more separators 308b may extend from front wall 302a to a position less than the width of base 302. In other embodiments, one or more separators 308b may extend the width of base 302, from front wall 302a to back wall 302c.

As discussed earlier, each ferrule bay 308 is defined by bay opening 308a, separators 308b (and side walls 302b, 302d in some cases), and rear opening 308c. In various embodiments, each ferrule bay 308 may include one or more ferrule bay alignment features 308d, 308e. Whether smart ferrule carrier 300 is in a serial orientation or a parallel orientation depends on how the tagged optical ferrule assemblies 100 are arranged with each ferrule bay 308. Ferrule bay alignment features 308d, 308e may assist in ensuring that tagged optical ferrule assemblies 100 are correctly installed for proper alignment for the intended nature of the ferrules (i.e., parallel or serial). In various embodiments, ferrule bay alignment features 308d, 308e may be configured to mate with one or more carrier alignment feature 106 of each tagged optical ferrule assembly 100.

Ferrule bay alignment feature 308d may be configured to mate with at least one carrier alignment feature 106 such that the ferrules are arranged in a serial arrangement and parallel to base 302, while ferrule bay alignment feature 308e may be configured to mate with the same or one or more different carrier alignment features (not pictured in FIG. 3B) such that the ferrules are arranged in a parallel alignment and perpendicular to base 302. In various embodiments, ferrule bay alignment feature 308d may be configured to mate with a different one or more carrier alignment features of tagged optical ferrule assembly 100 to orient tagged optical ferrule assembly 100 in a serial orientation. Ferrule bay alignment features 308d, 308e may be disposed anywhere within ferrule bays 308, such as (but not limited to) the opposite separator 308b, the length extending from bay opening 308a and rear opening 308c, across the width of ferrule bay 308, among others. In some embodiments carrier alignment feature may be a protruding rib and ferrule bay alignment features 308d, 308e may be recesses complimentarily shaped to accept carrier alignment feature.

In various embodiments, ferrule bay alignment features 308d, 308e and/or carrier alignment features may be configured to maintain polarity during reconfiguration. When two ferrule carriers are mated, it is important that the transmit ferrule of each tagged optical ferrule assembly 100 in a first smart ferrule carrier mates with the receive ferrule of the corresponding tagged optical ferrule assembly 100 in a second smart ferrule carrier. In various embodiments, ferrule bay alignment feature 308d may be configured to ensure tagged optical ferrule assembly 100 are inserted to create a serially-oriented smart ferrule carrier and that the ferrules of each tagged optical ferrule assembly 100 are oriented consistently, and ferrule bay alignment feature 308e may be configured to ensure tagged optical ferrule assemblies 100 are inserted to create a parallelly-oriented smart ferrule carrier and that the ferrules of each tagged optical ferrule assembly 100 are oriented consistently. In other embodiments, the nature of each ferrule bay alignment feature 308d, 308e may be switched (i.e., ferrule bay alignment feature 308d associated with a parallel alignment, ferrule bay alignment feature 308e associated with a serial alignment).

As illustrated in FIG. 3A, smart ferrule carrier 300 includes a lid 304 disposed on side wall 302d. Lid 304, when closed, serves to hold tagged optical ferrule assemblies 100 within the interior of each ferrule bay 308, preventing movement in the y-direction. In various embodiments, lid 304 may include a carrier lid latch 304a configured to mate with a carrier lid catch 302e disposed on side wall 302b. In other embodiments, lid 304 may be disposed on side wall 302b and carrier lid catch 302e may be disposed on side wall 302d. Lid 304 may also include tab 304b dispatched on an edge of the lid 304 corresponding to back wall 302c of base 302. In various embodiments, tab 304b may be a carrier securing feature configured to secure smart ferrule carrier 300 when installed in a socket of a smart carrier adapter (not shown in FIG. 3A). As illustrated in FIG. 3A, tab 304b is a push-pull tab style latch utilized in the field. In other embodiments, tab 304b may be any low-profile latching device used for securing communication cables within a communication port currently known, or any developed now or in the future, for use in high-density cabling installations. In some embodiments, tab 304b may be disposed on back wall 302c of base 302.

In various embodiments, lid 304 may have the same width and length of base 302. Although shown as a rectangle, in other embodiments, lid 204 may be have a different design. As a non-limiting example, in various embodiments lid 304 may include one or more cutouts on one or more edges and/or disposed on the surface of lid 304. Lid 304 may take on any design providing sufficient coverage of tagged optical ferrule assemblies 100, and in some embodiments providing sufficient area for a tab 304b to be disposed. In various embodiments, lid 304 may include notations identifying one or more of ferrule bays 308 within smart ferrule carrier 300. As a non-limiting example, lid 304 may include a numeral (e.g., 1, 2, 3, etc.) identifying each of the eight (8) ferrule bays 308, as illustrated in FIG. 3A.

Smart ferrule carrier 300 includes a smart carrier board 306 disposed on base 302. Smart carrier board 306 may be a printed circuit board or other substrate used in the art. In various embodiments, smart carrier board 306 may include a carrier controller 306a configured to retrieve and store identification data from a plurality of tags contained within the tag optical ferrule assemblies 100 disposed within the ferrule bays 308 of smart ferrule carrier 300. In various embodiments, carrier controller 306a may be any type of processing chip known in the art, including but not limited to an application specific integrated circuit (ASIC), a system on chip (SoC), a field programmable gate array (FPGA), microprocessor, an integrated circuit comprising a plurality of logic gates, flip-flops, multiplexers, and other circuit components, a complementary metal-oxide-semiconductor (CMOS) processing chips, or any other type of processing chip or integrated circuit known in the art. In some embodiments, carrier controller 306a may comprise a plurality of processing chips that work together to perform the functions of carrier controller 306a. The plurality of processing chips may include a plurality of the same type of processing chip or a combination of different types of processing chips.

Figure 3C:
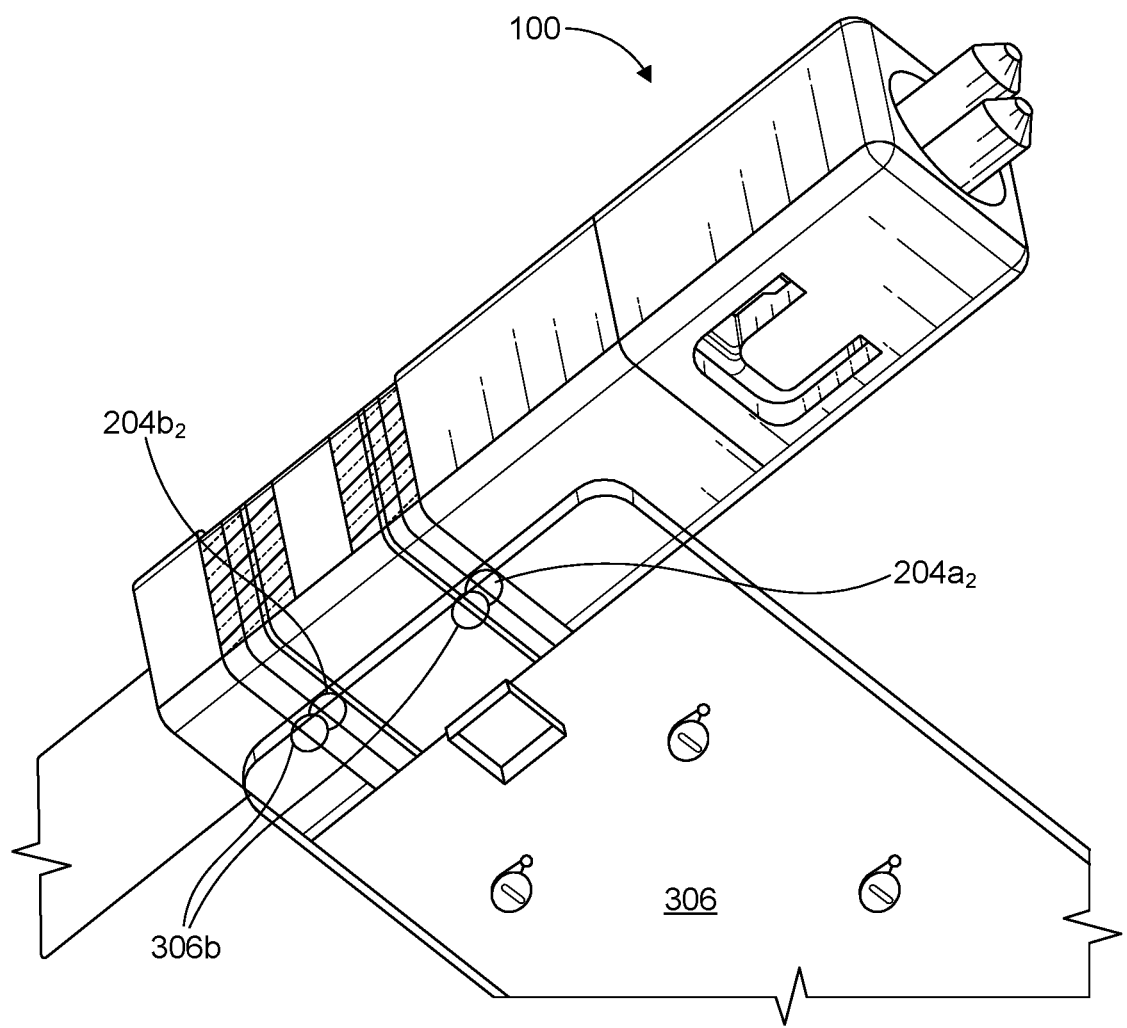
FIG. 3C illustrates an example interaction between a tagged optical ferrule assembly and a smart carrier board in accordance with embodiments of the technology disclosed herein.

Carrier controller 306a may enable both read and write capabilities for each ID tag within smart ferrule carrier 300. As discussed above, carrier controller 306a is communicatively coupled to the tag reader/writer and capable of reading identification information stored on each ID tag of the plurality of tagged optical ferrule assemblies 100. Carrier controller 306a may enable in some embodiments for identification information to be written to one or more ID tags within smart ferrule carrier 300. Smart carrier board 306 may include a plurality of spring contact clips 306b disposed along smart carrier board 306 and configured to communicatively couple to one or more of the terminals of tagged optical ferrule assemblies 100. FIG. 3C illustrates the alignment of spring contact clips 306b and terminals $204a_2$, $204b_2$. Tag reader/writer logic may be included within carrier controller 306a in various embodiments, and communicatively coupled to spring contact clips 306b to allow for reading/writer of ID tag 202.

FIG. 3B is another perspective view of smart ferrule carrier 300, illustrating the interior components of ferrule bays 308 and other components connected to smart carrier board 306. For ease of discussion, some elements of smart ferrule carrier 300 are omitted. Such omission should not be interpreted as those elements not being present in the embodiment of FIG. 3B. As illustrated in FIG. 3A, smart carrier board 306 is connected to one or more ferrule assembly interface 310, which may indicate to carrier controller 306a whether a tagged optical ferrule assembly 100 is present within the respective ferrule bay 308 for the carrier controller 306a to later read/write ID tag 202 on each ferrule 100. In various embodiments, the one or more ferrule assembly interfaces 310 may comprise an antenna. In various embodiments, an external tag 312 may be disposed on a side wall (e.g., side wall 302d of FIG. 3A) of smart ferrule carrier 300. External tag 312 may be configured to enable a technician to read/write identification information for the plurality of tagged optical ferrule assemblies 100 within smart ferrule carrier 300 using a manual probe comprising a tag reader/writer. Although not visible, smart carrier board 306 is also connected to power and management contacts 314 in various embodiments. Power and management contacts 314 may be used to receive power signals and management signals from a smart carrier adapter (not shown in FIG. 3A, discussed in greater detail below). In some embodiments, ferrule assembly interface 310, external tag 312, and/or power and management contacts 314 may be disposed on or coupled to smart carrier board 306, while in other embodiments electrical traces may connect smart carrier board 306 to ferrule assembly interface 310, external tag 312, and/or power and management contacts 314. In some embodiments, smart carrier board 306 may be a rigid board, a flex circuit or a rigid-flex (i.e., multiple rigid board portions interconnected with flex circuit portions). In embodiments where smart carrier board 306 comprises a rigid board, wires or flex circuits may couple to external tag 312 and ferrule contact interfaces 310. In embodiments where smart carrier board 306 comprises a flex circuit, external tag 312 and ferrule contact interfaces 310 may be disposed on the same flex circuit with rigid backings where needed, e.g., behind contacts where pressure will be applied or portions of the flex circuit that need to be rigidly secured.

Figure 3D:
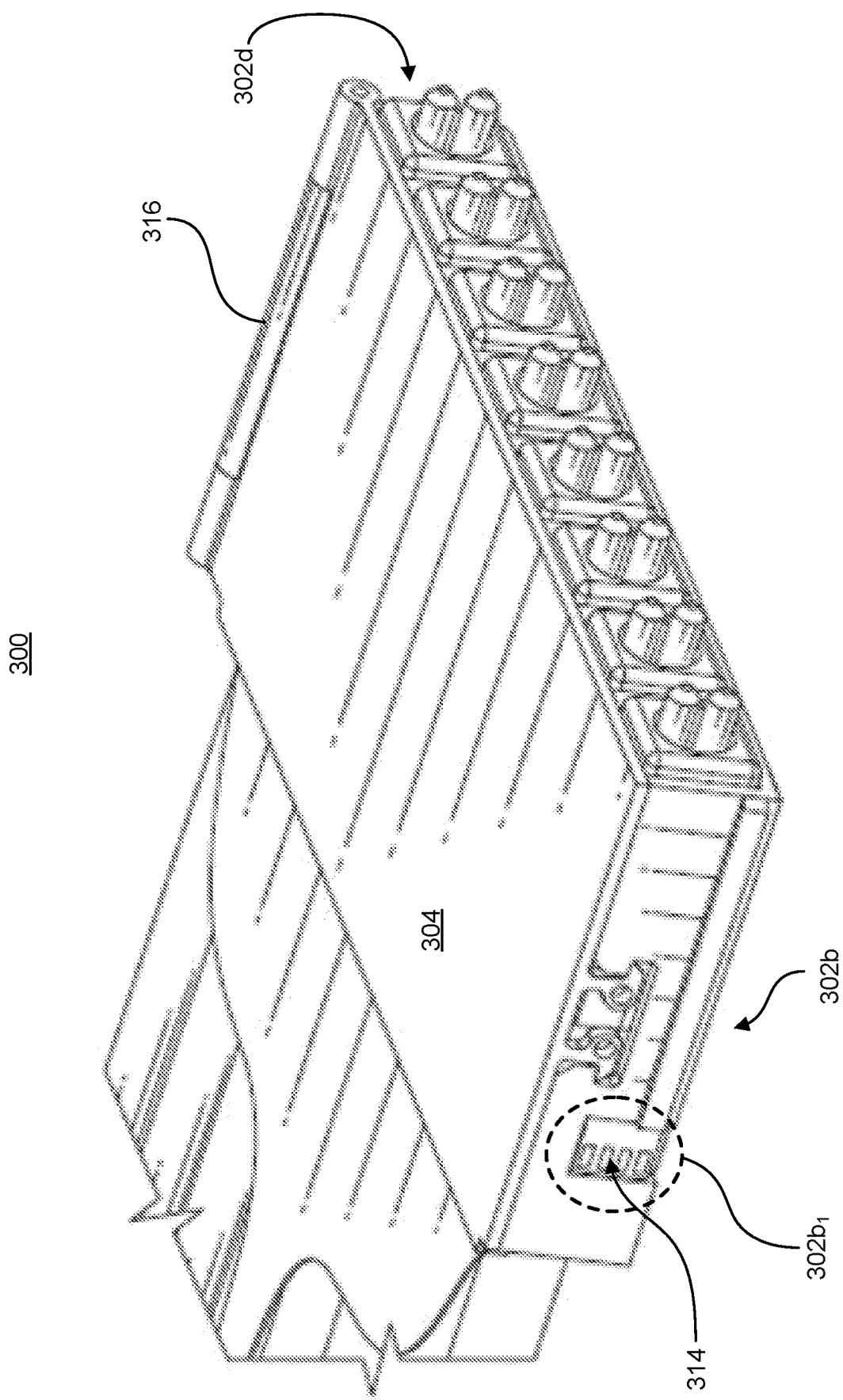
FIG. 3D illustrates another view of the smart ferrule carrier of FIG. 3A in a closed position.
Figure 3E:
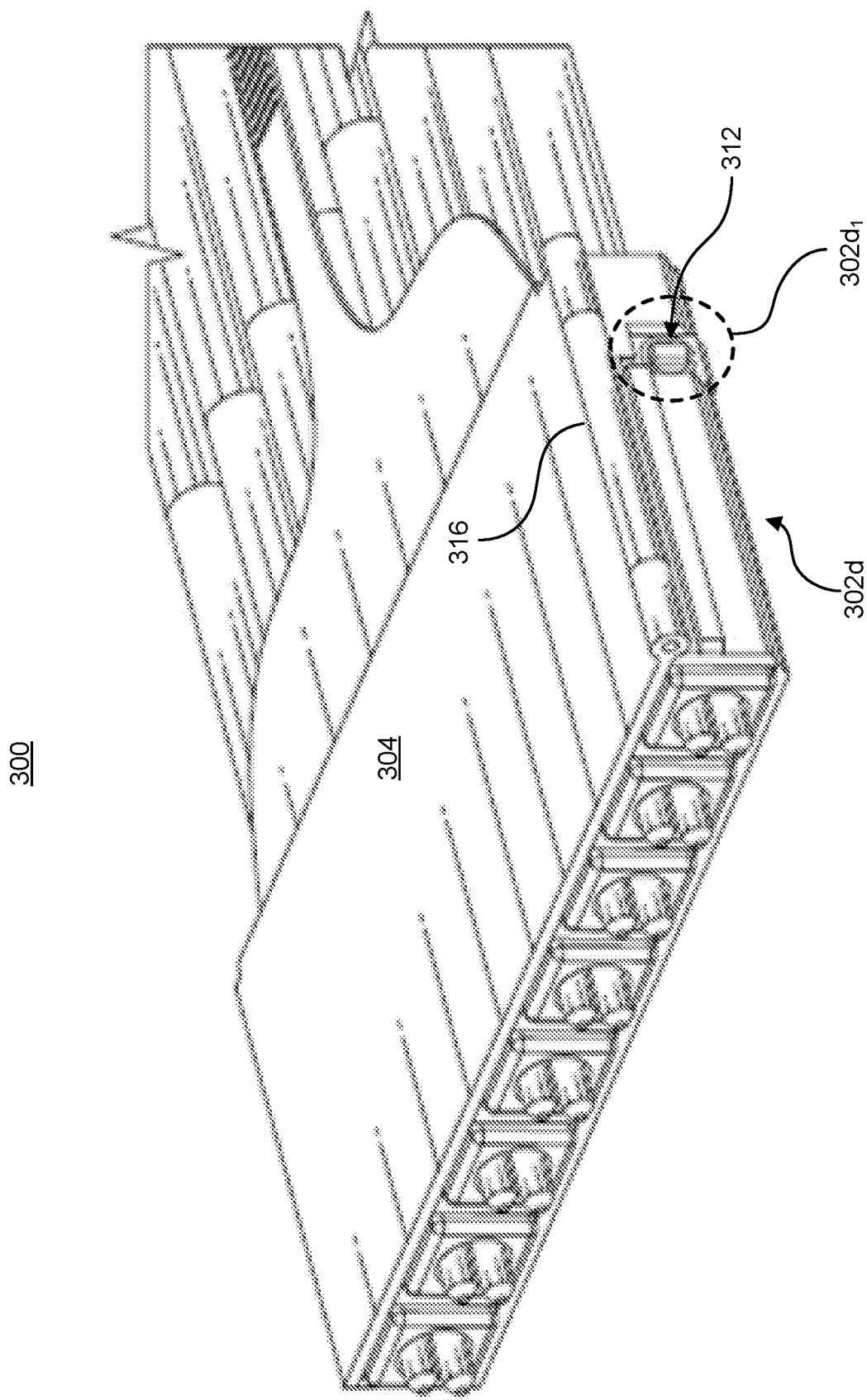
FIG. 3E illustrates another view of the smart ferrule carrier of FIG. 3A in a closed position.

FIGS. 3D and 3E show smart ferrule carrier 300 fully populated with lid 304 closed. As shown in FIG. 3D, side wall 302b includes an opening $302b_1$ providing access to power and management contacts 314. As discussed in more detail with respect to FIG. 6A, opening $302b_1$ allows power and management contacts 314 to connect with power and management pins of a smart carrier adapter when smart ferrule carrier 300 is installed. In various embodiments, a first set of contacts 314 may be configured for communicating management signals, while a second set of contacts 314 may be configured to providing power to smart ferrule carrier 300. A technician may send read, write, or other commands to carrier controller 306a (not pictured in FIG. 3D) of smart ferrule carrier 300 through the first set of contacts 314. In various embodiments, hinge 316 may be disposed on side wall 302d, coupling lid 304 to base 302 and allows lid 304 to pivot open and close. In the closed position, carrier lid latch 304a mates with the carrier lid catch 302e disposed on side wall 302b. In various embodiments, hinge 316 may be utilized as an alignment feature for installing smart ferrule carrier 300 into a slot of a smart carrier adapter (not shown in FIG. 3D, discussed with respect to FIG. 6A).

As shown in FIG. 3E, side wall 302d may include an opening $302d_1$ providing access to external tag 312. As discussed above, external tag 312 may be used by a technician for manually reading/writing the identification information for the tagged optical ferrule assemblies 100 disposed within smart ferrule carrier 300 by using a manual probe comprising a tag reader/writer. In some embodiments, opening $302b_1$ may be disposed on the same side wall of smart ferrule carrier 300 as opening $302d_1$, configured such that the power and management contacts 314 may connect with power and management signal pins of a smart carrier adapter without hindering the ability for a technician to use a manual probe with external tag 312.

Although discussed with respect to example tagged optical ferrule assembly 100, as discussed above the technology of the present disclosure is not limited to assemblies like tagged optical ferrule assembly 100. FIG. 4 illustrates another example smart ferrule carrier 402 configured to work with another example tagged optical ferrule assembly 400 in accordance with embodiments of the present disclosure. For ease of discussion, FIG. 4 omits common elements of smart ferrule carrier 402 and smart ferrule carrier 300. As a non-limiting example, although not pictured in FIG. 4, one or more ferrule assembly detectors, like ferrule assembly detectors 310 of FIG. 3B, a tag for manual probing, like external tab 312 of FIG. 3B, and signal contacts, like power and management signal contacts 314 of FIG. 3B, are present within smart ferrule carrier 400. Unless expressly stated otherwise, it should be assumed that smart ferrule carrier 400 includes components of smart ferrule carrier 300.

As illustrated in FIG. 4, tagged optical ferrule assembly 400 includes a contactless ID tag 404. Unlike ID tag 202 discussed with respect to FIG. 2, contactless ID tag 404 is configured to emit a radio signal containing the identification information rather than transferring such data through physical contact. In various embodiments, contactless ID tag 404 may be a similar type of tag as ID tag 202, only without a physical input/output (I/O)-type ID tag 202. A non-limiting example of a contactless ID tag 404 includes a NFC tag having an antenna that emits a radio signal containing identification information when a sufficient power signal is received from an NFC probe. In various embodiments, each contactless tag reader in each ferrule bay comprises a tag antenna pair $408a_1$, $408a_2$. In various embodiments, tag reader/writer logic may be a part of the smart controller 406a disposed on smart carrier board 406. In other embodiments, each ferrule bay 308 may include tag reader/writer logic disposed therein, as a non-limiting example, on a processing chip communicatively coupled between tag antenna pair $408a_1$, $408a_2$ and smart carrier board 406. In various embodiments, tag reader/writer logic may be shared between a plurality of tag antenna pairs within smart ferrule carrier 400. A person of ordinary skill in the art would know that tag reader/writer logic may be disposed at any point along the path from tag antenna pair $408a_1$, $408a_2$ and carrier controller 406a. Multiple tag antennae from various ferrule bays may be electrically coupled to smart carrier controller 406a via smart carrier board 406. Tag antenna pairs $408a_1$, $408a_2$ may be disposed within each ferrule bay of smart ferrule carrier 402. Each tag antenna pair $408a_1$, $408a_2$ comprises a side-wall antenna $408a_1$ and a base antenna $408a_2$, each antenna being electrically and independently coupled to tag reader/writer logic and/or smart carrier controller 406a. As illustrated in FIG. 4, a first side-wall antenna $408a_1$ is disposed on a side wall of smart ferrule carrier 402, and a first base antenna $408a_2$ is disposed on the base of smart ferrule carrier 402. Similarly, a second tag antenna pair $408b_1$, $408b_2$ is disposed in a second ferrule bay. A second base antenna $408b_1$ is disposed on a separator between two ferrule bays (not shown in FIG. 4), and a second base antenna $408b_2$ is disposed on the base of smart ferrule carrier 402.

As discussed above, a plurality of smart ferrule carriers, such as smart ferrule carriers 300 and/or 402, can be inserted into a smart carrier adapter to provide low-cost, low-loss, and high-density optical connectivity. FIG. 6A is a perspective view of an example smart carrier adapter 600 in accordance with embodiments of the technology disclosed herein. As illustrated, smart carrier adapter 600 may comprise a plurality of carrier keying features 602a, 602b along an interior of smart carrier adapter 600. In various embodiments, carrier keying features 602a, 602b may be configured to mate with a corresponding alignment feature of smart ferrule carriers. Hinge 316 of smart ferrule carriers (discussed with respect to FIGS. 3A and 3B) may comprise the corresponding alignment feature configured to mate with a carrier keying feature 602a, 602b in some embodiments. In other embodiments, the carriers may include a separate alignment feature (not shown in FIGS. 3A and 3B) configured to mate with one or more carrier keying features 602a, 602b of smart carrier adapter 600.

Smart carrier adapter 600 may include an adapter mating surface 608 for mounting smart carrier adapters 600 within the system. In various embodiments, adapter mating surface 608 may comprise a raised rim along the exterior of each smart carrier adapter 600 (as illustrated by adapter mating surface 608 in FIG. 6A). Adapter mating surface 608 may include one or more gendered mounting structures, such as groove mounting structure 608a and tongue mounting structure 608b. Each gendered mounting structure may be configured to couple with a corresponding gendered mounting structure of a smart carrier adapter bracket and/or a corresponding generated mounting structure of another smart carrier adapter 600.

In various embodiments, carrier keying features 602a, 602b may be disposed on both sides of an adapter mid-wall 612. Adapter mid-wall 612 may serve to divide smart carrier adapter 600 into two sides, each side comprising a carrier receptacle configured to accept a plurality of smart ferrule carriers. In various embodiments, adapter mid-wall 612 may comprise a 2D array of ferrule mating sleeves 604. Each ferrule mating sleeve 604 may be configured to accept a ferrule, enabling a final alignment feature for the ferrules from tagged optical ferrule assemblies on either side of adapter mid-wall 612 to mate. In various embodiments, a pair of ferrule mating sleeves 604 may be configured to align with ferrules extending out from a ferrule bay opening of a smart ferrule carrier that, when the smart ferrule carrier is inserted into smart carrier adapter 600, each ferrule is inserted into one of ferrule mating sleeves 604.

Figure 6A:
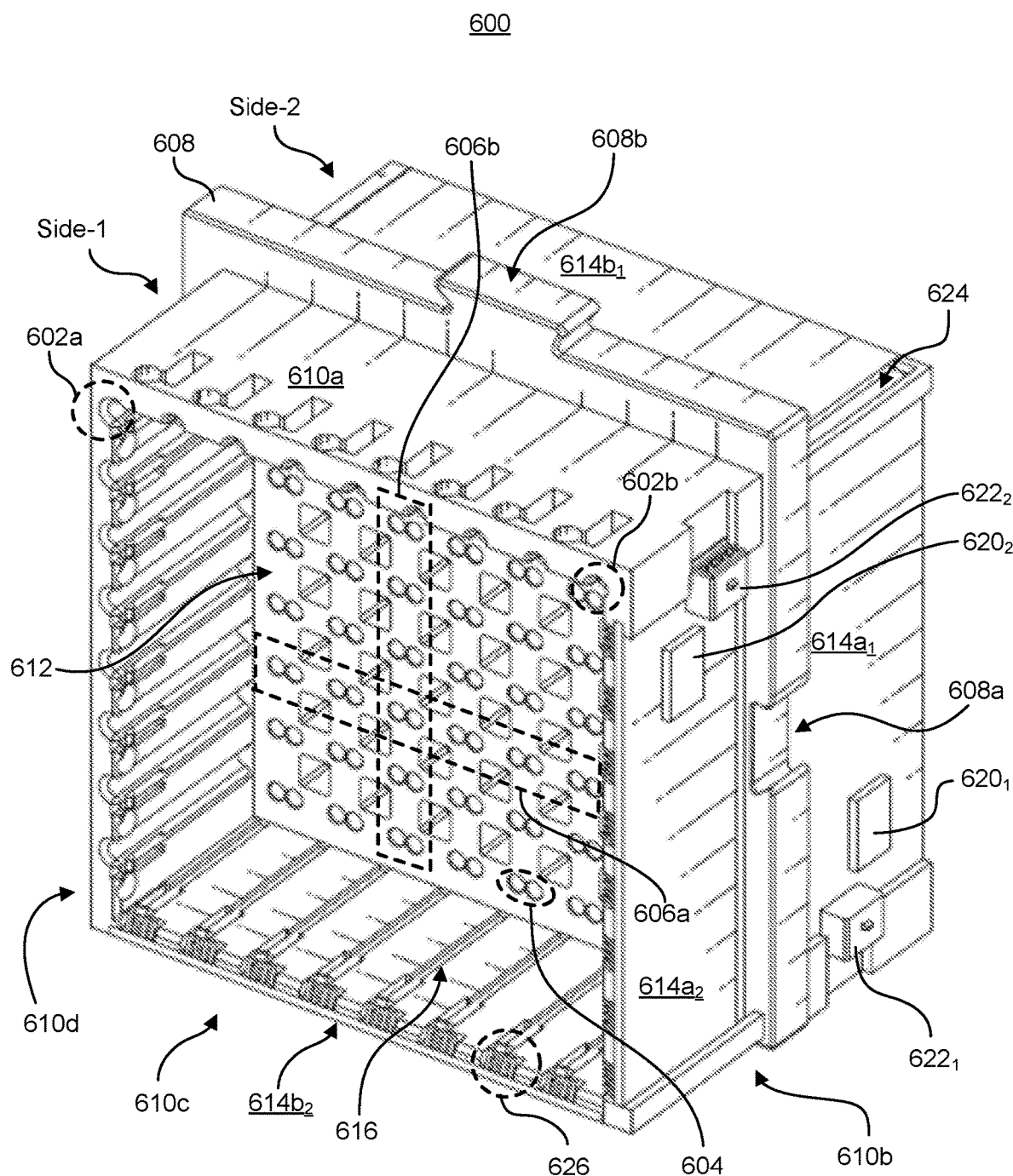
FIG. 6A illustrates an example smart carrier adapter in accordance with embodiments of the technology disclosed herein.

As illustrated in FIG. 6A, adapter mid-wall 612 separates smart carrier adapter 600 into two sides, Side-1 and Side-2. Side-1 comprises a first carrier receptacle and a second carrier receptacle. Each carrier receptacle is configured to accept a plurality of smart ferrule carriers in one of two orientations. Each carrier receptacle comprises a cavity 616 defined by adapter housing sides 610a, 610b, 610c, 610d. For ease of reference, the carrier receptacle is discussed with respect to the first carrier receptacle of Side-1, defined by adapter housing sides 610a, 610b, 610c, 610d. Adapter housing sides 610a, 610b, 610c, 610d are identified with respect to Side-1 of smart carrier adapter 600, but a person of ordinary skill in the art would understand that each adapter housing side 610a, 610b, 610c, 610d encompasses two portions bisected by adapter mating surface 608. The front wall of each smart ferrule carrier couples to adapter mid-wall 612 such that the ferrules of the tagged optical ferrule assemblies within the first carrier receptacle are inserted within ferrule mating sleeves to mate with ferrules of tagged optical ferrule assemblies within the second carrier receptacle. In various embodiments, adapter mid-wall 612 may have a thickness such that, when the ferrules are mated through the plurality of ferrule mating sleeves, a front wall of the smart ferrule carrier and/or the front of each tagged optical ferrule assembly abuts the adapter mid-wall 612. In other embodiments, adapter mid-wall 612 may have a smaller thickness with one or more projections configured to abut the front wall of each carrier.

To facilitate reconfigurability, the cavity 616 of smart carrier adapter 600 may be open, lacking dividers between rows or columns of ferrule mating sleeves 604. As illustrated with dashed-line boxes in FIG. 6A, a smart ferrule carrier may be inserted into smart carrier adapter 600 in a horizontal orientation 606a or a vertical orientation 606b. Although illustrated as an 8×8 matrix (i.e., having eight horizontal orientation 606a slots or eight vertical orientation 606b slots), in other embodiments smart carrier adapter 600 may include fewer slots configured to accept a smart ferrule carrier with accordingly fewer number of tagged optical ferrule assemblies. In some other embodiments, a greater number of slots may be included with accordingly greater number of tagged optical ferrule assemblies. As a non-limiting example, smart carrier adapter 600 may comprise a 6×6 matrix, meaning that each side of smart carrier adapter 600 may accept six smart ferrule carriers with each smart ferrule carrier holding six tagged optical ferrule assemblies. A person of ordinary skill in the art would appreciate that the subject matter is not limited to a particular size, and that smart carrier adapter 600 may be sized as required for a given implementation.

Smart carrier adapter 600 includes two adapter controller systems 614, comprising a main adapter controller board $614a_1$, $614a_2$ and a secondary adapter controller board $614b_1$, $614b_2$. Similar to smart carrier board 306 enabling smart-functionality in the smart ferrule carrier 300 discussed with respect to FIG. 3A, adapter controller systems 614 enable the smart-functionality of smart carrier adapter 600. Adapter controller system 614 comprises two sets of adapter controller board pairs (a first pair $614a_1$, $614b_1$ and a second pair $614a_2$, $614b_2$) where one set of adapter controller board pairs is installed in each side of the smart carrier adapter 600. For ease of discussion, adapter controller system 614 is discussed with respect to the first adapter controller board pair $614a_1$, $614b_1$. A person of ordinary skill in the art would understand the following description to apply equally to the second adapter controller board pairs $614a_2$, $614b_2$. As illustrated in FIG. 6A, main adapter controller board $614a_1$ includes an adapter controller $620_1$. In various embodiments, adapter controller $620_1$ may be similar to the types of processing chips discussed above with respect to carrier controller 306a of FIG. 3A. In various embodiments, adapter controller $620_1$ may be one or more processing chips distributed across main adapter controller board $614a_1$. In other embodiments, adapter controller $620_1$ may be one or more processing chips distributed across both main adapter controller board $614a_1$ and secondary adapter controller board $614b_1$. Main adapter controller board $614a_1$ includes a system controller interface $622_1$. System controller interface $622_1$ enables a system controller (e.g., a management controller within a network device) to communicate with smart carrier adapter 600 (and, through smart carrier adapter 600, to communicate with each smart ferrule carrier installed in smart carrier adapter 600). System controller interface $622_1$ may be any type of communication interface known in the art. In some embodiments, system controller interface $622_1$ may provide communication signals as well as power signals through one or more pins of system interface controller $622_1$.

In various embodiments, main adapter controller board $614a_1$, $614a_2$ may further include an on-board power converters (not pictured in FIG. 6A) to provide necessary power levels to the components of adapter controller systems 614. In embodiments where power is received through system controller interface $622_1$, $622_2$, power signal conditioning circuitry may be included in adapter controller $620_1$, $620_2$, integrated into main adapter controller board $614a_1$, $614a_2$ and/or secondary adapter controller board $614b_1$, $614b_2$. Main adapter controller board $614a_1$, $614a_2$ and secondary adapter controller board $614b_1$, $614b_2$ may be communicatively connected through a connector circuit $624_1$, $624_2$. In some embodiments, connector circuit $624_1$, $624_2$ may be a flex circuit, while in other embodiments connector circuit $624_1$, $624_2$ may be a flex-rigid circuit assembly where carrier contact pins 626 and system controller interface $622_1$, $622_2$ may be supported by rigid circuit portions or rigid backing of flex circuit portions. In various embodiments, connector circuit $624_1$, $624_2$ may comprise rigid connectors, electrical traces within the housing of smart carrier adapter 600, individual wired connections, or a number of other methods of communicatively connecting printed circuit boards known in the art.

Main adapter controller board $614a_1$, $614a_2$ and secondary adapter controller board $614b_1$, $614b_2$ include a plurality of carrier contact pins 626 extending from a bottom surface of each board $614a_1$, $614a_2$, $614b_1$, $614b_2$. Carrier contact pins 626 are configured to contact power and management contacts 314 discussed above with respect to FIG. 3D, and designed to enable smart carrier adapter 600 to provide interfaces for management signals and power signals to each installed smart ferrule carrier. As illustrated in FIG. 6A, a set of carrier contact pins 626 is included for each slot in which a smart ferrule carrier may be inserted, allowing adapter controller $620_1$, $620_2$ (and, therefore, allowing the system controller) to communicate with the respective smart ferrule carrier. In various embodiments, smart carrier adapter 600 may include a plurality of apertures (as illustrated in FIG. 6A) configured to allow carrier contact pins 626 to extend into cavity 616. In other embodiments, main adapter controller board $614a_1$, $614a_2$ and secondary adapter controller board $614b_1$, $614b_2$ may have a width greater than the width of cavity 616 such that the edge of each board $614a_1$, $614a_2$, $614b_1$, $614b_2$ containing carrier contact pins 626 overhangs the surface of smart carrier adapter 600 on which boards $614a_1$, $614a_2$, $614b_1$, $614b_2$ are disposed, allowing carrier contact pins 626 to electrically couple to corresponding power and management contacts 314 of each smart ferrule carrier.

In various embodiments, carrier contact pins 626 may also function as retention mechanisms to secure each smart ferrule carrier within the first carrier receptacle and/or the second carrier receptacle. As a non-limiting example, carrier contact pins 626 may be disposed on a retention feature configured such that, when a smart ferrule carrier is inserted into a slot of a carrier receptacle of Side-1 or Side-2, carrier contact pins 626 make contact with power and management signal contacts 314 of the smart ferrule carrier and provide sufficient bias on the smart ferrule carrier to maintain proper installation within the carrier receptacle of Side-1 or Side-2. In various embodiments, a carrier release (not shown in FIG. 6A) may be provided for each carrier contact pins 626 such that each smart ferrule carrier may be decoupled from smart carrier adapter 600 individually, while in other embodiment the carrier release may be configured to control one or more sets of carrier contact pins 626.

Figure 6B:
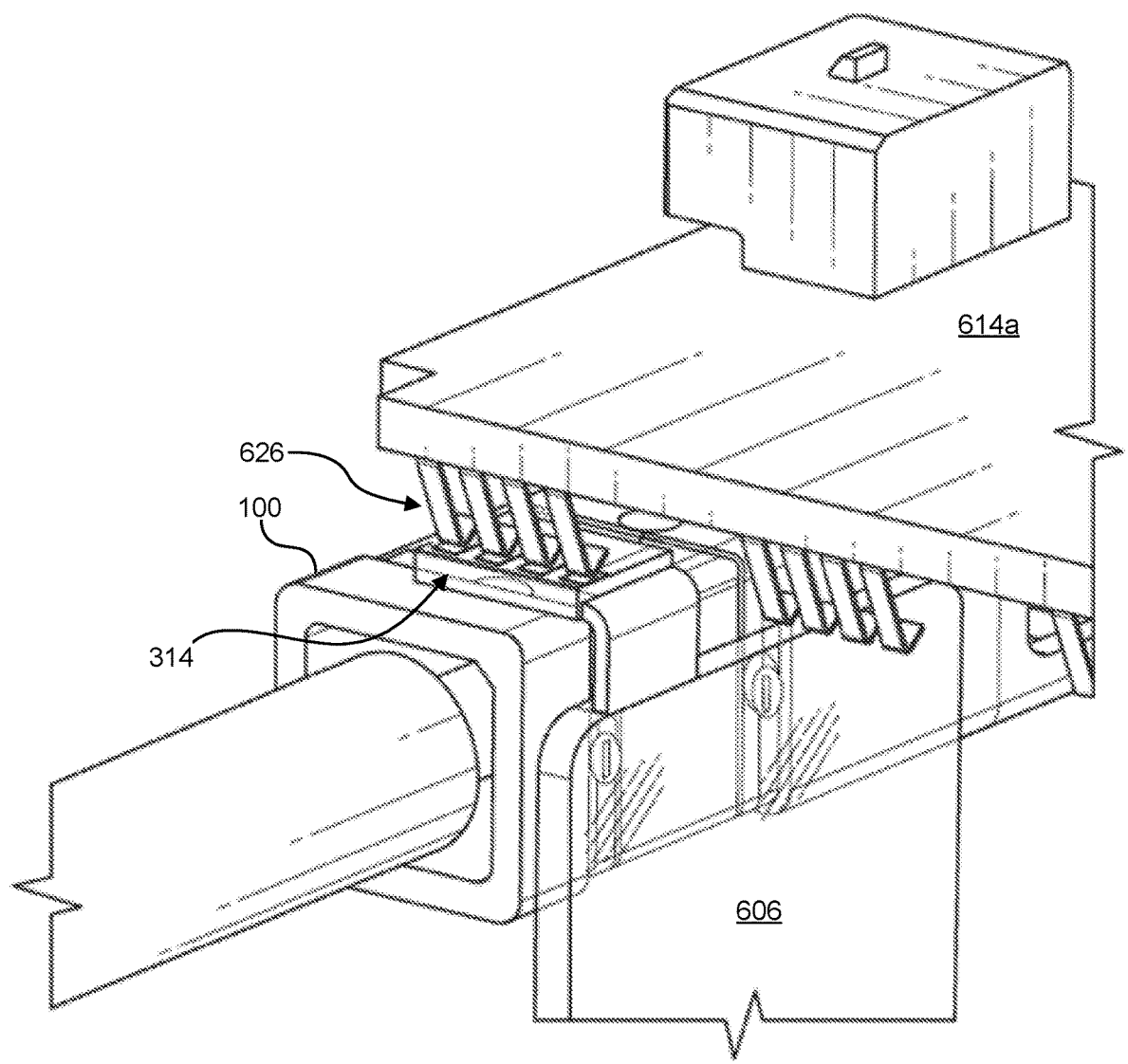
FIG. 6B shows an example interaction between terminal pins of a smart carrier adapter and power and management contacts of a smart ferrule carrier when inserted into the smart carrier adapter in accordance with embodiments of the technology disclosed herein.

FIG. 6B is an illustration of the interaction between carrier contact pins 626 in a smart carrier adapter and power and management contacts 314 in a smart ferrule carrier in accordance with embodiments of the present disclosure. For ease of discussion, smart carrier adapter 600 and housing 302 of smart ferrule carrier 300 have been omitted, making it easier to see the connection. As illustrated, power and management contacts 314 extend out from carrier controller board 606 and sits in between carrier contact pins 626 and tagged optical ferrule assembly 100. In this way, main adapter controller board $614a_1$, $614a_2$ may be communicatively coupled to carrier controller board 606 without interfering with tagged optical ferrule assembly 100.

Although shown in FIG. 6A as being disposed on an exterior surface of smart carrier adapter 600, adapter controller systems 614 may be built into the housing of smart carrier adapter 600 in other embodiments. As a non-limiting example, rather than having adapter controller systems 614 exposed as illustrated in FIG. 6A, a person of ordinary skill in the art would understand that the housing of smart carrier adapter 600 could extend over the top of adapter controller systems 614 with at least one opening for system controller interface $622_1$, $622_2$ to be exposed (i.e., most of main adapter controller board $614a_1$, $614a_2$ and secondary adapter controller board $614b_1$, $614b_2$ would not be visible). In other embodiments, the entirety of adapter controller systems 614 may be covered by the housing of smart carrier adapter 600, and system controller interface $622_1$, $622_2$ may be built into the housing.

Each half of smart carrier adapter 600 (Side-1 and Side-2) may include its own respective adapter controller system 614 (as illustrated in FIG. 6A). Each adapter controller system 614 would be responsible for managing the smart ferrule carriers inserted within a given cavity 616. In various embodiments, a single adapter controller system 614 may be disposed on smart carrier adapter 600, with necessary carrier contact pins 626 extending from each board 614a, 614b of the adapter controller system 614 to communicatively couple to power and management contacts 314 of smart ferrule carriers inserted on either side of adapter mid-wall 612. As a non-limiting example, adapter controller system 614 may be configured to manage smart ferrule carriers inserted into both the first carrier receptacle of Side-1 and the second carrier receptacle of Side-2, with main adapter controller board $614a_1$ and secondary adapter controller board $614b_1$ being disposed on either Side-1 or Side-2 of smart carrier adapter housing 610. In this way, a single adapter controller $620_1$ could manage all communication and power distribution within smart carrier adapter 600.

Figure 6C:
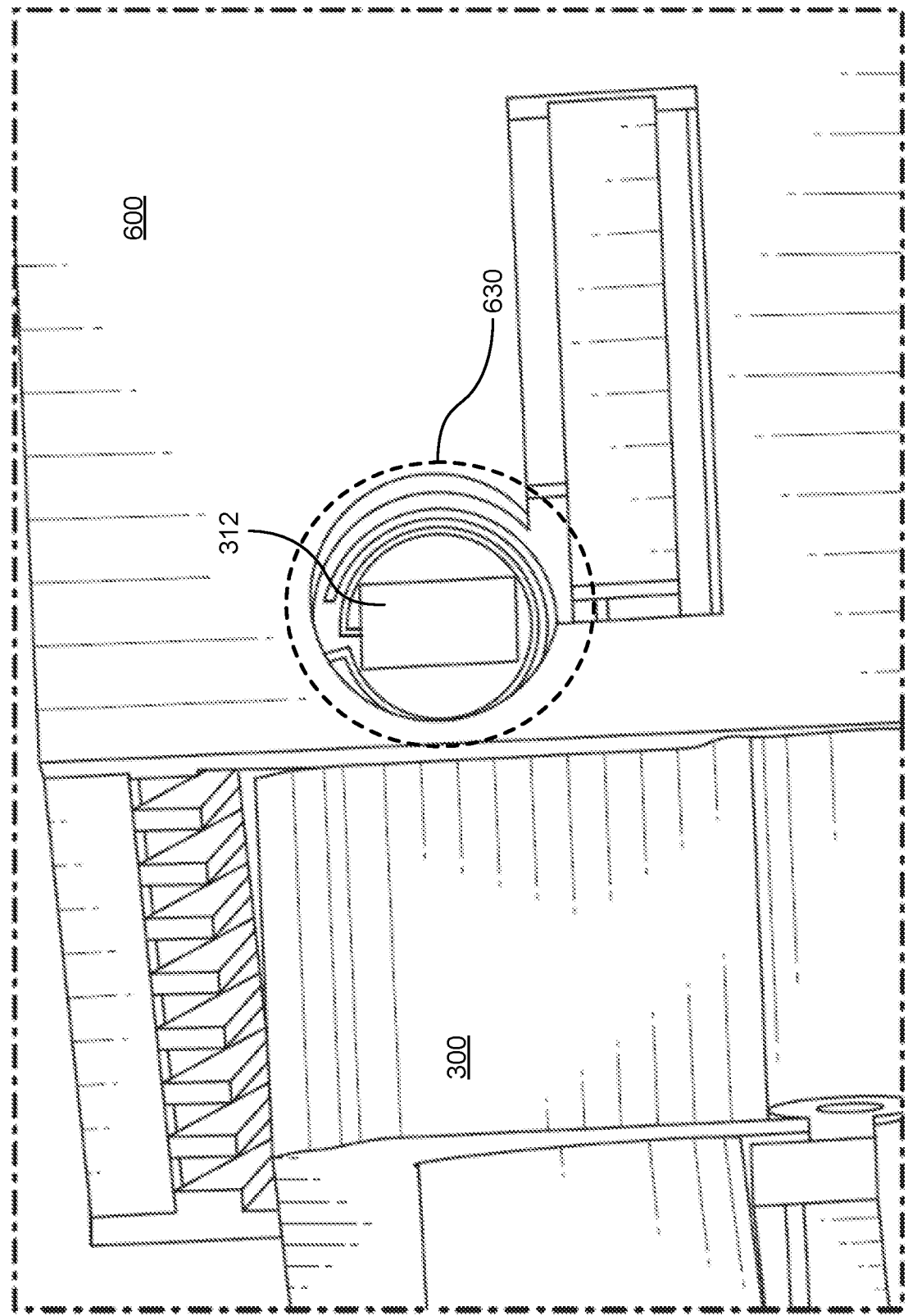
FIG. 6C illustrates an example manual probe access opening of a smart carrier adapter in accordance with embodiments of the technology disclosed herein.

As discussed above, smart ferrule carrier 300 includes an external tag 312 to enable use of a manual probe to retrieve identification information for the plurality of smart ferrule carriers within the respective smart ferrule carrier 300. FIG. 6C shows an example manual probe access opening 630 in accordance with embodiments of the present disclosure. As illustrated, manual probe access opening 630 may be disposed on a side of smart carrier adapter 600 and positioned over a location where external tag 312 of smart ferrule carrier 300 is located when smart ferrule carrier 300 is inserted into smart carrier adapter 600. Through this opening 630, a technician can insert a manual probe to read and/or write identification information with respect to the specific smart ferrule carrier 300.

Referring back to FIG. 6A, main adapter controller board 614$a_1$, 614$a_2$ and secondary adapter controller board 614$b_1$, 614$b_2$ are shown as being disposed on adjacent sides of smart carrier adapter 600. Accordingly, smart carrier adapter 600 is compatible with smart ferrule carriers inserted in either horizontal orientation 606$a$ or vertical orientation 606$b$. In this way, smart carrier adapter 600 can be easily reconfigured in the field as needed, making deployment of updated network topologies easier, more efficient, and less costly (e.g., reducing the need for reconstructing smart carrier adapter 600).

The above embodiments have been discussed with respect to power and management contacts 314 being disposed on only one side of smart ferrule carrier 300 of FIGS. 3A-3D. However, in some embodiments, power and management contacts 314 may be split between both sides of smart ferrule carrier 300. For example, the set of contacts 314 configured for power signals may be disposed on one side of smart carrier board 306 of smart ferrule carrier 300, while the set of contacts 314 configured for management signals may be disposed on the opposite side. This could be due to constraints of the carrier controller board (e.g., smart carrier board 306 of FIGS. 3A-3D), adapter controller systems 614, or a combination thereof. In such embodiments, adapter controller systems 614 illustrated in FIG. 6A will not provide all of the connections between carrier contact pins 626 and power and management contacts 314 as required. Accordingly, in some embodiments, main adapter controller board 614$a_1$, 614$a_2$ and secondary adapter controller board 614$b_1$, 614$b_2$ may need to be disposed parallel to each other on opposing sides of smart carrier adapter 600.

FIG. 7 illustrates an example split-board smart carrier adapter 700 in accordance with embodiments of the technology disclosed herein. Split-board smart carrier adapter 700 includes all of the same components as those discussed with respect to smart carrier adapter 600 of FIGS. 6A-6C, except that adapter controller system 714 includes a main adapter controller board 714$a$ disposed on a top side of split-board smart carrier adapter 700 and secondary adapter controller board 714$b$ is disposed on the bottom side of split-board smart carrier adapter 700, opposite and parallel to main adapter controller board 714$a$. In various embodiments, the two boards 714$a$, 714$b$ may be connected by connector circuit 724. Connector circuit 724 may be similar to connector circuit 624 discussed with respect to FIG. 6A, only extending the length of a side of split-board smart carrier adapter 700 due to the placement of the boards 714$a$, 714$b$.

As mentioned above, although the descriptive text may refer to elements depicted in the figures as being on the "top," "bottom" or "side" of an apparatus, such references are merely descriptive and do not imply or require that the invention be implemented or used in a particular spatial orientation unless explicitly stated otherwise.

By arranging main adapter controller board 714$a$ and secondary adapter controller board 714$b$ in this way, split-board smart carrier adapter 700 is capable of providing the necessary carrier contact pins 726 for providing both power and management signals. As a non-limiting example, management signal pins 726$a$ may be disposed on main adapter controller board 716$a$, and power signal pins 726$b$ may be disposed on secondary adapter controller board 716$b$. In other embodiments, the disposition of carrier contact pins 726$a$, 726$b$ may be determined based on the location of corresponding power and management contacts 314 of smart ferrule carriers 300.

As illustrated in FIG. 7, split-board smart carrier adapter 700 is configured for acceptance of smart ferrule carriers in a set orientation, based on the sides of split-board smart carrier adapter 700 on which each board 714$a$, 714$b$ is disposed. As a non-limiting example, Side-1 of split-board smart carrier adapter 700 may be configured such that all smart ferrule carriers inserted into Side-1 must be in a vertical orientation 706$b$, while all smart ferrule carriers inserted into Side-2 must be in a horizontal orientation 706$a$, providing for a parallel-to-serial optical connection between the smart ferrule carriers on each side. In other embodiments, both Side-1 and Side-2 may be configured such that all of the smart ferrule carriers inserted into either side must be in either the horizontal orientation 706$a$ or the vertical orientation 706$b$, to provide parallel-to-parallel or serial-to-serial connectivity. In various embodiments, adapter controller system 714 may be removably secured to split-board smart carrier adapter 700 such that reconfiguration is possibly by changing the position of main adapter controller board 714$a$ and secondary adapter controller board 714$b$ from one side of split-board smart carrier adapter 700 to an adjacent side.

Implementing the various embodiments discussed above enables efficient electronic labeling or tagging of high-density optical fiber ferrules, automatic detection of all-to-all connected smart ferrule carriers holding tagged optical ferrule assemblies within a smart carrier adapter, writing of specific system configurations in smart carrier adapters, smart ferrule carriers, and/or tagged optical ferrule assemblies, fast system deployment, debugging, and configuration changes, and lower operating costs for managing high-density fiber topologies.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A smart ferrule carrier, comprising:
a base comprising a plurality of ferrule bays, each ferrule bay being configured to hold a tagged optical ferrule assembly;
a smart carrier board disposed on the base, the smart carrier board comprising a plurality of spring clip contacts and a tag reader/writer logic; and
a carrier controller disposed on the smart carrier board and communicatively coupled to the plurality of spring clip contacts and the tag reader/writer logic; and
an external tag communicatively coupled to the smart carrier board and configured to enable identification information for all tagged optical ferrule assemblies within the smart ferrule carrier to be accessible by a manual probe,
wherein identification (ID) information stored on an ID tag of one or more tagged optical ferrule assemblies is accessible from the carrier controller through one or more of the plurality of spring clip contacts and the tag reader/writer logic.

2. The smart ferrule carrier of claim 1, each ferrule bay further comprising one or more ferrule assembly interfaces configured to indicate to the carrier controller the presence of a tagged optical ferrule assembly within the ferrule bay.

3. The smart ferrule carrier of claim 2, wherein the one or more ferrule assembly interfaces are disposed on a side bay wall of each ferrule bay, wherein the side bay wall comprises a separator between two ferrule bays or a side wall of the smart ferrule carrier.

4. The smart ferrule carrier of claim 1, further comprising a first side wall and a second side wall, wherein an opening on the first side wall is configured to allow access to the plurality of spring clip contacts and an opening on the second side wall is configured to allow access to the external tag.

5. The smart ferrule carrier of claim 1, wherein identification information includes one or more of: a name assigned to a respective tagged optical ferrule assembly; a processing chip to which the respective tagged optical ferrule assembly is connected; a manufactured date; a manufacturing company; a number and a type of fibers installed in each tagged optical ferrule assembly; a ferrule end-face type; a number of ferrules installed in each tagged optical ferrule assembly; a type of smart ferrule carrier defined by an orientation; or a combination thereof.

6. The smart ferrule carrier of claim 1, wherein the plurality of spring clip contacts are configured to contact one or more terminals of the ID tag of the tagged optical ferrule within each ferrule bay.

7. The smart ferrule carrier of claim 1, each ferrule bay comprising a first alignment feature configured to position the tagged optical ferrule assembly in a parallel orientation and a second alignment feature configured to position the tagged optical ferrule assembly in a serial orientation, and wherein a type of smart ferrule carrier is defined by each tagged optical ferrule assembly being in the parallel orientation or the serial orientation.

* * * * *